US006664949B1

(12) United States Patent
Amro et al.

(10) Patent No.: US 6,664,949 B1
(45) Date of Patent: Dec. 16, 2003

(54) INTEROPERABLE/HETEROGENEOUS ENVIRONMENT KEYBOARD

(75) Inventors: Hatim Yousef Amro, Austin, TX (US); John Paul Dodson, Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/434,803

(22) Filed: Nov. 5, 1999

(51) Int. Cl.[7] .................................................. G09G 5/00
(52) U.S. Cl. ........................................ 345/168; 345/156
(58) Field of Search ................................. 345/158, 163, 345/168, 169, 170

(56) References Cited

U.S. PATENT DOCUMENTS

| 4,628,541 | A | | 12/1986 | Beavers ........................ 455/603 |
| 5,189,543 | A | | 2/1993 | Lin et al. ...................... 359/142 |
| 5,481,265 | A | * | 1/1996 | Russell .......................... 341/22 |
| 5,724,106 | A | * | 3/1998 | Autry et al. ................. 348/734 |
| 5,729,220 | A | * | 3/1998 | Russell .......................... 341/22 |
| 5,900,867 | A | * | 5/1999 | Schindler et al. ............ 345/327 |
| 5,903,259 | A | * | 5/1999 | Brusky et al. ............... 345/168 |
| 5,943,042 | A | * | 8/1999 | Siio ............................. 345/172 |
| 5,952,996 | A | * | 9/1999 | Kim et al. ................... 345/158 |
| 6,133,833 | A | * | 10/2000 | Sidlauskas et al. ......... 340/572 |
| 6,288,709 | B1 | * | 9/2001 | Willner et al. .............. 345/169 |
| 6,292,172 | B1 | * | 9/2001 | Makhlouf .................... 345/157 |

* cited by examiner

Primary Examiner—Vijay Shankar
Assistant Examiner—Nitin Patel
(74) Attorney, Agent, or Firm—Duke W. Yee; Leslie A. Van Leeuwen; Michael R. Nichols

(57) ABSTRACT

A computing system including a plurality of data processing systems and a peripheral input device. The peripheral input device includes a computer selector for selecting one of the plurality of data processing systems for interaction with the peripheral input device. The peripheral input device also includes a wireless transmitter for providing communications with any one of the plurality of data processing systems. Each of the plurality of data processing systems includes a wireless receiver for receiving wireless communications from the peripheral input device.

15 Claims, 4 Drawing Sheets

Method for Determining if Computer has been Selected

Computer Selection Method for Keyboard

AT9-99-697

INTEROPERABLE/HETEROGENEOUS ENVIRONMENT KEYBOARD

BACKGROUND OF THE INVENTION

1. Technical Field

The present invention relates generally to data processing systems and, more specifically, to methods of efficiently utilizing space allocated to storing data processing systems and associated peripheral devices.

2. Description of Related Art

Computers perform many functions in today's society, often performing tasks and monitoring processes with minimal or no human intervention. Many businesses and service providers may have rooms or laboratories filled with numerous computers, all running various applications or monitoring various activities for the business or service provider. Often, to provide the applications or monitoring needed or desired by the business or service provider, very large numbers of computers are required to perform all the various tasks.

The rooms in which these computers are located are often very crowded. In addition to each individual computer or system unit, each computer also includes a monitor, a keyboard and mouse. Indeed, it is a common problem that there are often more computers than available space in which to store them.

One of the inefficiencies with storing a large number of computers within a finite amount of space is the keyboard redundancy. For every "n" number of computers that are stored, there are typically "n" number of keyboards also stored. However, keyboards are rather large and bulky and take up a rather large amount of space, especially when large numbers of computers are involved, as is typically true in most computer labs. As mentioned above, however, many or most of the computers within the room may be performing functions in which little or no direct human interaction is involved. Often times, the vast majority of computers within the room need a keyboard or other peripheral input device to interact with a computer so infrequently that it does not make sense to store one keyboard for every computer in the room. Therefore, many if not most of the keyboards within the computer lab or room are redundant.

Thus, a system for reducing the number of keyboards required to service a lab full of computers is desirable. It would be even more desirable, if, for some large number of computers, only a few keyboards were needed to service all of the computers within the lab. Thus, a keyboard that can be used with more than one computer is desirable. This arrangement would free up a large amount of space, thereby increasing the capacity of computers that could be stored in the same amount of space.

SUMMARY OF THE INVENTION

The present invention minimizes the number of keyboards required to service a large number of computers. In a preferred embodiment, the system includes a peripheral input device, such as a keyboard or mouse, and a plurality of data processing systems. Each of the data processing systems has a wireless receiver for receiving wireless communications from the peripheral input device. The peripheral input device includes a computer selector for selecting one of the plurality of data processing systems to which the peripheral input device will interact. The peripheral input device also includes a wireless transmitter for providing communications with any one of the plurality of data processing systems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
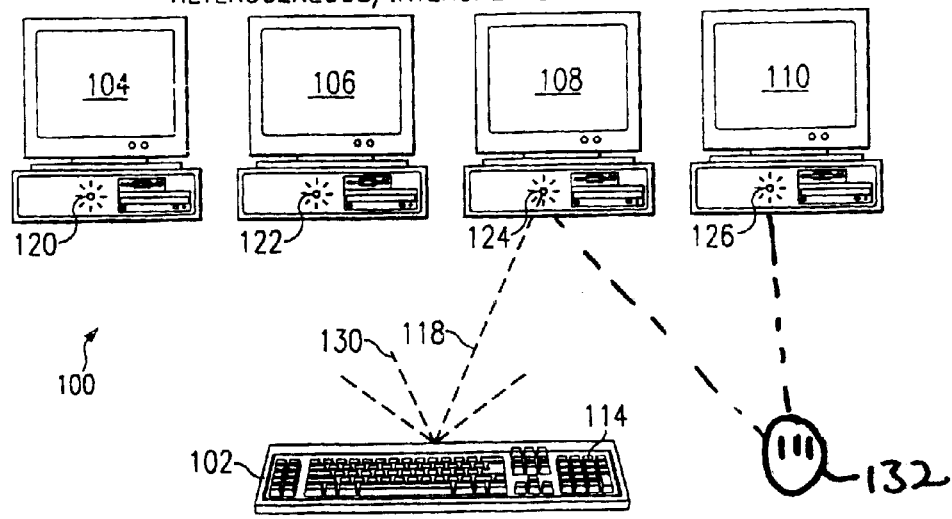
FIG. 1 depicts a block diagram of a data processing system in which the present invention may be implemented.

With reference now to the figures, and in particular with reference to FIG. 1, a pictorial diagram illustrating a room 100 of computers serviced by a single keyboard is depicted in accordance with a preferred embodiment of the present invention. Room 100 comprises four data processing systems 104, 106, 108, and 110 and a keyboard 102. Data processing systems 104, 106, 108, and 110 may be implemented, for example, as data processing system 300 described below. Keyboard 102 may be implemented, for example, as infra-red wireless keyboard 200 described below. Keyboard 102 is interoperable with multiple types of data processing systems having different hardware configurations and running different operating systems, thus functioning in a heterogeneous environment.

Figure 2:
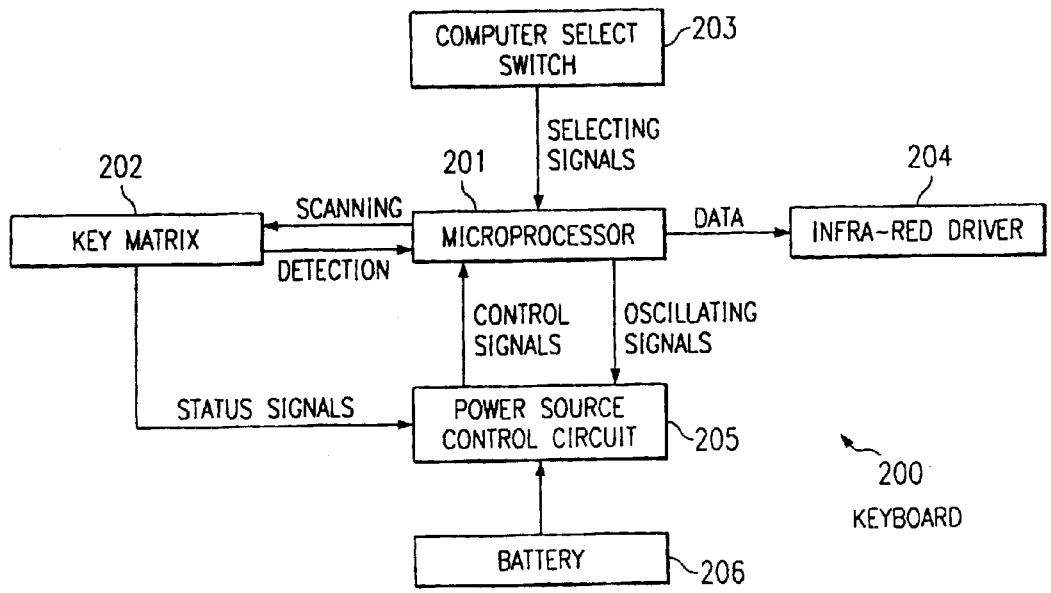
FIG. 2 depicts a block diagram of an infrared wireless keyboard in which the processes of the present invention may be implemented.

Referring now to FIG. 2, a block diagram of an infrared wireless keyboard 200 in which the processes of the present invention may be implemented is illustrated. Infrared wireless keyboard 200 comprises a microprocessor 201, key matrix 202, computer select button 203, infrared driver 204, power source control circuit 205, and battery 206. Computer select button 203 allows a user to select a specific data processing system from a plurality of data processing systems to which keyboard 200 will be assigned by aiming the infrared emitter at the selected data processing system and pushing computer select button 203.

Keyboard 200 may also include a keyboard select on/off switch (not shown). Such an on/off switch would allow a user to activate and deactivate computer select button 203 such that after assigning the keyboard to a computer, computer select button 203 may be deactivated such that the user can not inadvertently deassign or reassign the keyboard during operation. Once the user decided to deassign or reassign the keyboard to a different computer, the on/off switch is placed in the on position allowing activation of computer select button 203.

In operation, microprocessor 201 sends scanning signals to key matrix 202 in order to detect the depression of one of the keys. If no keys are depressed, power source control circuit 205 places microprocessor 201 into a low-power standby mode. Control circuit 205 also resets microprocessor 201 if power is cut off, ensuring proper microprocessor operation in all cases. If a key has been depressed, control circuit 205 switches microprocessor 201 to a normal operating mode. Microprocessor 201 assigns a key code to the depressed key according to its position in the key matrix. A data word is then created by microprocessor 201 from the key code. Software within microprocessor 201 then generates a carrier frequency and transmits the data word according to a known communications format such as RS 232, at the carrier frequency. Infra-red driver 204 emits the data through an infra-red LED.

Figure 3:
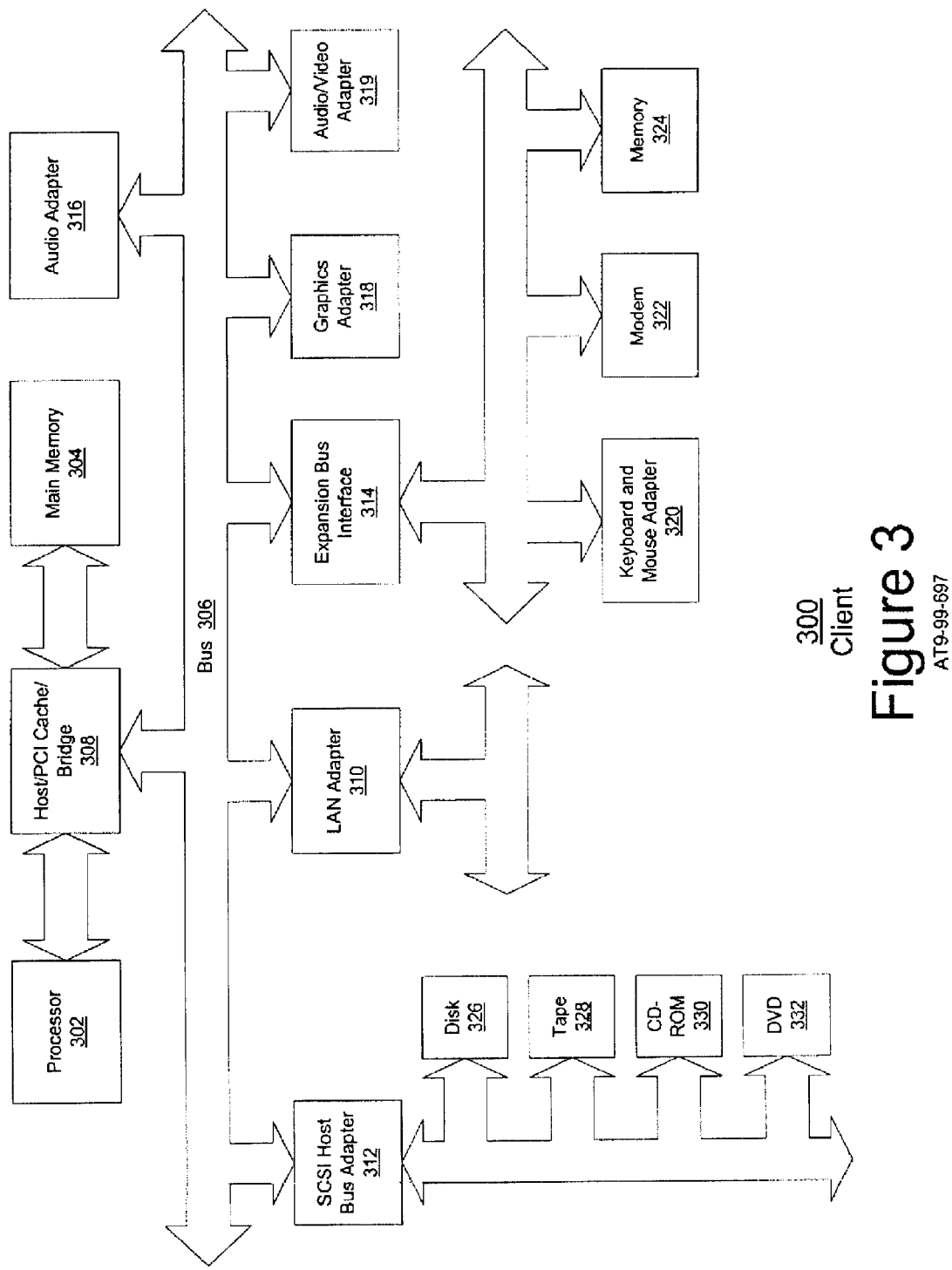
FIG. 3 depicts a pictorial diagram illustrating a room of computers serviced by a single keyboard in accordance with a preferred embodiment of the present invention.

Referring now to FIG. 3, a block diagram of a data processing system in which the present invention may be implemented is illustrated.

Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. Keyboard mouse adapter 320 also provides an interface to a infrared detector and transmitter used to provide wireless communications with a keyboard and/or mouse. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Referring again to FIG. 1, each of data processing systems 104, 106, 108, and 110 includes an infra-red receiver 120, 122, 124, and 126 respectively. Each of data processing systems 104, 106, 108, and 110 may comprise different hardware and run a different operating system. For example, data processing systems 104 and 110 may be Intel processor based personal computers running Microsoft Windows 98 operating systems, data processing system 106 may be an Apple Macintosh computer running the System 7 operating system, and data processing system 108 may be an IBM RS/6000, a product of International Business Machines Corporation in Armonk, N.Y., running the Advanced Interactive Executive (AIX) operating system. Keyboard 102 may select and operate any one of data processing systems 104, 106, 108, and 110.

Keyboard 102 includes an infra-red transmitter 130 such connected to an infra-red driver such as infra-red driver 204 for transmitting signals containing key stroke and other information to a data processing system, such as one of data processing systems 104, 106, 108, and 110, having an infra-red receiver. Keyboard 102 also includes a computer select button 114, which a user may use for selecting which of data processing systems 104, 106, 108, and 110 the user wishes to operate.

When a user desires to access one of data processing systems 104, 106, 108, and 110, the user merely aims keyboard 102 at the data processing system to which the user desires access and pushes computer select button 114. By pushing the computer select button, an infra-red signal is sent to the desired data processing system instructing that system that keyboard 102 will be communicating with it.

In the example illustrated in FIG. 1, the user has aimed keyboard 102 at data processing system 108 and has pushed computer select button 114 to emit a signal 118 which is detected by data processing system 108. Signal 118 alerts data processing system 108 that keyboard 102 is now assigned to data processing system 108. From this point on, all keystrokes are sent via infra-red (IR) to the assigned system unit 108.

When the user wishes to reassign keyboard 102 to a different data processing system, the user merely aims keyboard 102 at a different data processing system and pushes computer select button 114 to send a signal to the new data processing system that keyboard 102 is now assigned to the new data processing system.

In an alternate embodiment, each of data processing systems 104, 106, 108, and 110 is assigned a code or frequency. Every time a signal is received from keyboard 102, each of data processing systems 104, 106, 108, and 110 ignores the signal unless the signal is the code assigned to that particular data processing system indicating that it should respond to all future signals received from keyboard 102. If such a signal is received, then the data processing system performs the tasks requested by the signals received from keyboard 102.

When the user wishes to reassign keyboard 102 to a different data processing system, the user pushes the computer select button 114 to de-assign keyboard 102 from the selected data processing system. Receipt of a second select signal 118 by a data processing system alerts the data processing system that keyboard 102 is no loner assigned to it. Therefore, it should ignore any further communication received from keyboard 102 until it has been reselected. The user may then assign keyboard 102 to a different data processing system. In this embodiment, computer select button 114 might be a switch that can be toggled between the different codes assigned to the data processing systems or it could comprise a pair of buttons. One of these buttons is used to scroll through a list of computer codes (which may be displayed to the user via a small display such as an LCD on keyboard 102) by repeatedly pressing it. The other is used to select the appropriate code, once found, to send a signal to activate the appropriate data processing system.

Those of ordinary skill in the art will appreciate that the hardware in FIG. 1 may vary depending on the implementation. For example, more or fewer data processing systems may be utilized than that depicted in FIG. 1. Furthermore, the present invention is not limited to keyboards, but applies directly to a mouse (e.g., mouse 132) or any other peripheral device that exchanges data with a computer. The only requirement is that the peripheral device must have the capability of wireless communications with the data processing systems. Also, although described with reference to a single keyboard, there could be multiple keyboards within the computer lab. For example, a lab could contain 50 computers and five keyboards. Furthermore, more than one keyboard could be in operation at one time with, for example, one keyboard communicating with a first computer while a second keyboard is communicating simultaneously with a second computer.

Thus, the present invention allows most of a computer lab's keyboards to be discarded, thereby saving space and clutter. The user simply reassigns the keyboard (or one of a few keyboards, if there are more than one) as needed.

In another variation of the present invention, other wireless methods of transferring data between the keyboard and the computer could be used. For example, each computer in a computer lab could be equipped with a low power radio frequency (RF) receiver for receiving communication from a peripheral device having a low power radio frequency (RF) transmitter. Each computer could be assigned to a different radio frequency and each peripheral device could have a button or other selection device for selecting the transmitting frequency. Thus, if a user wished to access a computer with a keyboard, the user would select the receiving frequency of the computer as the transmitting frequency of the peripheral device.

Figure 4:
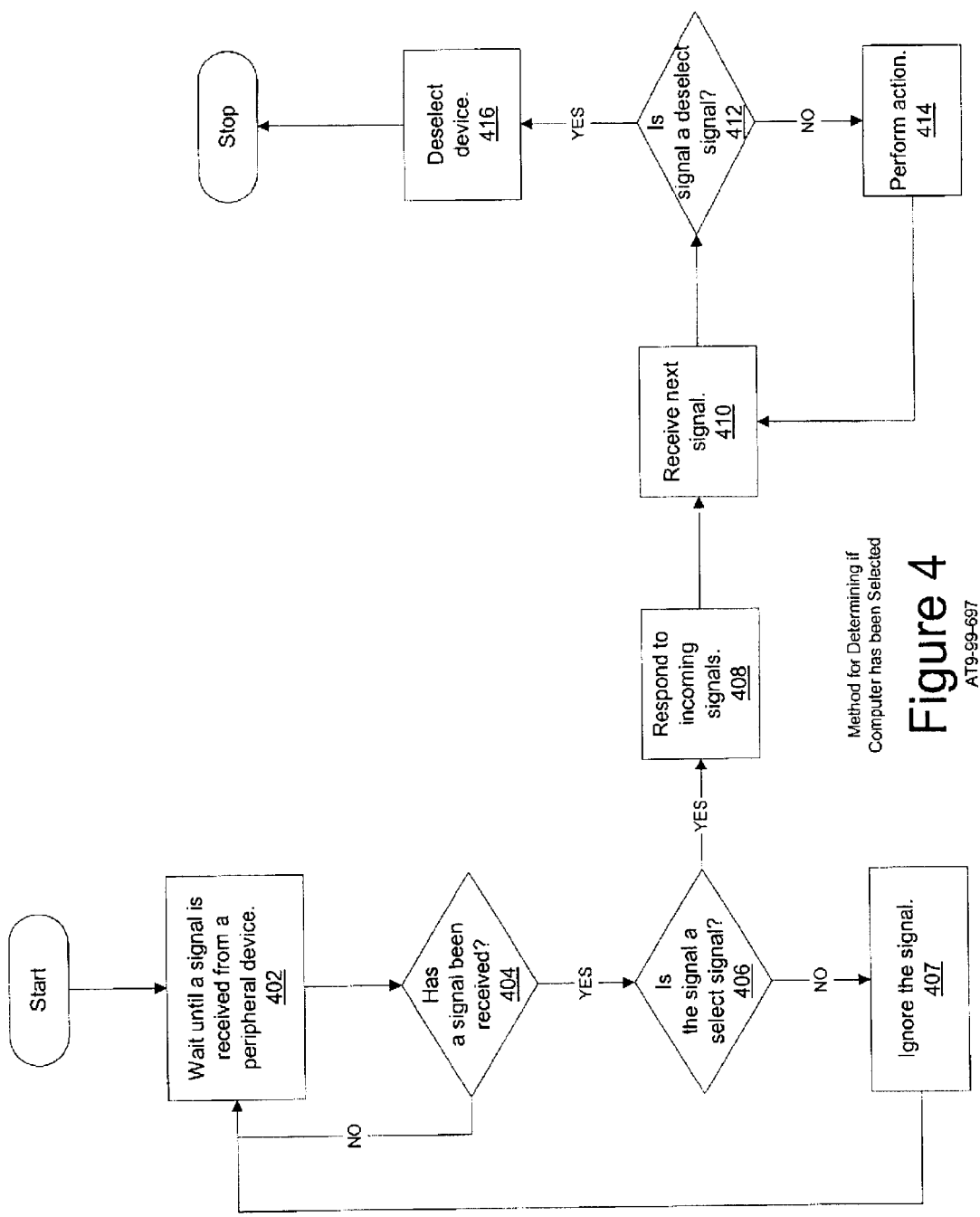
FIG. 4 depicts a flowchart illustrating a method of determining whether a keyboard has been assigned to a data processing system in accordance with a preferred embodiment of the present invention.

Referring now to FIG. 4, a flowchart illustrating a method of determining whether a keyboard has been assigned to a data processing system is depicted in accordance with a preferred embodiment of the present invention. A data processing system idles until a signal is received from a peripheral device (step 402). The data processing system determines whether a signal has been received (step 404). If no signal has been received, then data processing system continues to idle (step 402). If a signal has been received, then the data processing system determines if the received signal is a signal from a peripheral device indicating that that device has assigned itself to this data processing system (a computer select signal) (step 406). If the signal is not a computer select signal, then ignore the signal (step 407) and continue to wait for signals (step 402).

If the signal is a computer select signal, then respond to incoming signals from this device (step 408). The data processing device receives the next signal (step 410) and determines whether the signal is a deselect signal (step 412). If the signal is not a deselect signal, then perform the action indicated by the signal (step 414) and receive the next signal (step 410). if the signal is a deselect signal, then discontinue performing actions in response to signals received from the device (step 416). Note, the deselect signal could be identical to a select signal except for being the second select signal received from the peripheral device.

Figure 5:
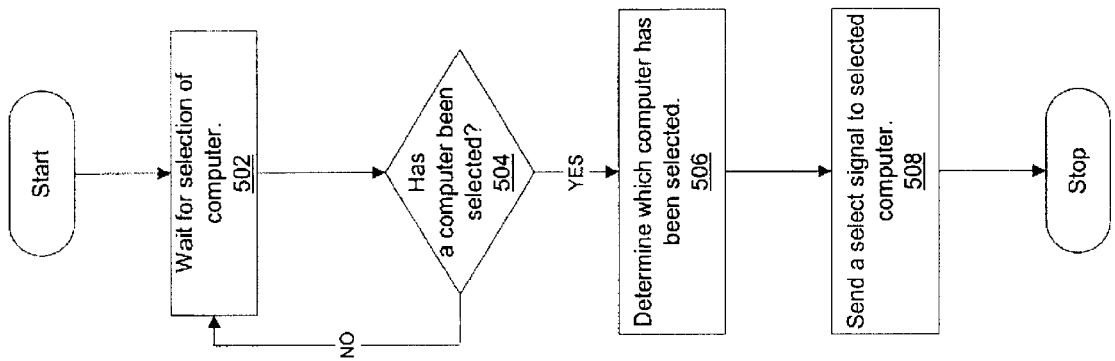
FIG. 5 depicts a flowchart illustrating a method in a keyboard for assigning the keyboard to a particular data processing system in accordance with the present invention.

Referring now to FIG. 5, a flowchart illustrating a method in a keyboard for assigning the keyboard to a particular data processing system is depicted in accordance with the present invention. To start, the keyboard waits for a user to select a computer to which to assign the keyboard (step 502). The keyboard then determines whether a computer has been selected (step 504). If a computer has not been selected, then the keyboard continues to wait for user input (step 502). If a computer has been selected, then the keyboard must determine which computer has been selected (step 506). The user may select a particular computer by selecting a code or frequency assigned to a particular computer or perhaps by "aiming" the keyboard at the particular computer or in any number of other manners. Once, the keyboard has determined which computer has been selected, the keyboard sends a signal to the selected computer indicating that the keyboard has been assigned to that computer (step 508).

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A wireless computer peripheral input device for use with a data processing system, the input device comprising:

a wireless transmitter for transmitting signals; and a selector for selecting a one of a plurality of data processing systems with which to operate, wherein invoking the selector causes a signal to be transmitted from the wireless transmitter, wherein the wireless transmitter is a radio frequency transmitter.

2. The input device as recited in claim 1, wherein the input device is a keyboard.

3. The input device as recited in claim 1, wherein the input device is a computer mouse.

4. The input device as recited in claim 1, Wherein the signal is an infrared signal.

5. The input device as recited in claim 1, wherein the selector allows selection of one of a plurality of radio frequencies, wherein each of the plurality of radio frequencies corresponds to a separate one of the plurality of data processing systems.

6. A computing system, comprising:

a plurality of data processing systems; and a peripheral input device; wherein the peripheral input device includes a computer selector for selecting one of the plurality of data processing systems for interaction with the peripheral input device;

the peripheral input device includes a wireless transmitter for providing communications with any of the plurality of data processing systems;

each of the plurality of data processing systems includes a wireless receiver for receiving wireless communications from the peripheral input device;

the wireless transmitter is a radio frequency transmitter;

the wireless receiver is a radio frequency receiver;

the wireless receiver of each of the plurality of data processing systems is tuned to accept input on a received radio frequency wherein the received radio frequency for each of the plurality of data processing systems is different from that of each of the other plurality of data processing systems; and the computer selector allows selection of one of a plurality of radio frequencies wherein each of the plurality of radio frequencies corresponds one of the received radio frequencies.

7. The computing system as recited in claim 6, wherein the peripheral input device is a keyboard.

8. The computing system as recited in claim 6, wherein the peripheral input device is a computer mouse.

9. A method for accessing a plurality of data processing systems using a wireless input device, the method comprising:

receiving a selection of a particular data processing system of the plurality of data processing systems;

transmitting a signal from the wireless input device to only activate the particular data processing system within the plurality of data processing systems; and sending data from the wireless input device to the particular data processing system after transmitting the signal to the particular data processing system, wherein the signal is a frequency recognized by the particular data processing system.

10. The method as recited in claim 9, wherein the signal is a code recognized by the particular data processing system.

11. A wireless input device for use with a data processing system, the input device comprising:

means for receiving a selection of a particular data processing system of the plurality of data processing systems;

means for transmitting a signal from the wireless input device to only activate the particular data processing system within the plurality of data processing systems; and means for sending data from the wireless input device to the particular data processing system after transmitting the signal to the particular data processing system, wherein the signal is a frequency recognized by the particular data processing system.

12. The wireless input device as recited in claim 11, wherein the wireless input device is a keyboard.

13. The wireless input device as recited in claim 11, wherein the wireless input device is a computer mouse.

14. The input device as recited in claim 11, wherein the signal is an infra-red signal.

15. The input device as recited in claim 11, wherein the signal is a radio-frequency signal.

\* \* \* \* \*